(12) United States Patent
Cottet (10) Patent No.: US 11,273,908 B2
(45) Date of Patent: Mar. 15, 2022

(54) FOLDING MAIN LANDING GEAR FOR CARGO AIRCRAFT

(71) Applicant: The Boeing Company, Chicago, IL (US)

(72) Inventor: Justin Duane Cottet, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 221 days.

(21) Appl. No.: 16/405,789

(22) Filed: May 7, 2019

(65) Prior Publication Data

US 2020/0354043 A1   Nov. 12, 2020

(51) Int. Cl.
  *B64C 25/14* (2006.01)
  *B64C 25/18* (2006.01)
  *B64C 25/16* (2006.01)
  *B64C 25/34* (2006.01)

(52) U.S. Cl.
  CPC .............. *B64C 25/14* (2013.01); *B64C 25/16* (2013.01); *B64C 25/18* (2013.01); *B64C 25/34* (2013.01); *B64C 2025/345* (2013.01)

(58) Field of Classification Search
  CPC ......... B64C 25/18; B64C 25/10; B64C 25/60; B64C 25/62; B64C 25/58; B64C 25/26; B64C 25/28; B64C 25/14; B64C 25/20; B64C 25/22

See application file for complete search history.

(56) References Cited

U.S. PATENT DOCUMENTS

| 2,049,066 | A | * | 7/1936 | Kindelberger | B64C 25/14 244/102 R |
|---|---|---|---|---|---|
| 3,315,919 | A | * | 4/1967 | Perdue | B64C 25/34 244/102 R |
| 4,720,063 | A | * | 1/1988 | James | B64C 25/14 244/102 R |
| 4,768,738 | A | * | 9/1988 | Weinert | H01L 51/42 244/53 R |
| 5,000,400 | A | * | 3/1991 | Stuhr | B64C 25/10 244/101 |
| 6,173,920 | B1 | * | 1/2001 | Meneghetti | B64C 25/34 244/100 R |
| 8,028,956 | B2 | * | 10/2011 | Chow | B64C 25/16 244/102 R |
| 2013/0112808 | A1 | * | 5/2013 | Guering | B64C 25/10 244/102 SS |

* cited by examiner

Primary Examiner — Joshua J Michener
Assistant Examiner — Colin Zohoori
(74) Attorney, Agent, or Firm — Duft & Bornsen, PC (57) ABSTRACT

Systems and methods for folding landing gear of a cargo aircraft. One embodiment is a main landing gear of an aircraft that includes a shock strut coupled to a truck with one or more wheels, and a yoke pivotally coupled with the shock strut via a lower trunnion, and pivotally coupled with an aircraft structure via an upper trunnion. The yoke is configured to pivot about the upper trunnion in a direction back toward a tail of the aircraft and up toward a fuselage of the aircraft, and the shock strut is configured to pivot about the lower trunnion in a direction forward toward a nose of the aircraft and up toward the fuselage of the aircraft to retract the one or more wheels.

20 Claims, 11 Drawing Sheets

FOLDING MAIN LANDING GEAR FOR CARGO AIRCRAFT

FIELD

This disclosure relates to the field of aircraft and, in particular, to landing gear for an aircraft.

BACKGROUND

Aircraft landing gears may retract during flight and extend for landing. A typical aircraft includes a wheel well that houses the landing gear during flight to reduce aerodynamic drag. However, some aircraft, such as cargo aircraft, may not include a wheel well in order to maximize interior space for cargo. Cargo aircraft also sometimes include high wings on an upper portion of the fuselage to maximize cargo space. With high wings, the landing gear is typically mounted to the fuselage. With the wings and wing-mounted engines higher off the ground, the center of gravity of the aircraft is higher as compared to a passenger aircraft. Furthermore, a cargo aircraft may have low ground clearance to facilitate loading and unloading cargo onto the cargo floor of the aircraft. Therefore, it would be desirable to have a landing gear arrangement for a cargo aircraft that takes into account these considerations.

SUMMARY

Embodiments described herein provide for a folding main landing gear for a cargo aircraft. The landing gear folds into a retracted position outside the fuselage for maximizing cargo space. Additionally, in the retracted position, the landing gear has a compact size with minimal frontal area to reduce aerodynamic drag. The configuration of the main landing gear also allows for increased stability of the aircraft, and in particular, improved ground stability for cargo aircraft that have high wings, a high center of gravity, and heavy cargo loads.

One embodiment is a main landing gear of an aircraft that includes a shock strut coupled to a truck with one or more wheels, and a yoke pivotally coupled with the shock strut via a lower trunnion, and pivotally coupled with an aircraft structure via an upper trunnion. The yoke is configured to pivot about the upper trunnion in a direction back toward a tail of the aircraft and up toward a fuselage of the aircraft, and the shock strut is configured to pivot about the lower trunnion in a direction forward toward a nose of the aircraft and up toward the fuselage of the aircraft to retract the one or more wheels.

Another embodiment is a method of retracting a main landing gear of an aircraft. The method includes initiating retraction of the main landing gear including a truck having one or more wheels, a shock strut attached to the truck, and a yoke pivotably coupled with the shock strut via a lower trunnion and pivotably coupled with a retraction actuator via an upper trunnion. The method also includes pivoting the yoke about the upper trunnion in a direction back toward a tail of the aircraft and up toward a fuselage of the aircraft, and pivoting the shock strut about the lower trunnion in a direction forward toward a nose of the aircraft and up toward the fuselage of the aircraft to retract the main landing gear.

Another embodiment is an aircraft that includes a pair of main landing gears. Each main landing gear includes wheels coupled by a truck and arranged in tandem longitudinally, and a shock strut including a bottom cylinder attached to the truck, and a top cylinder that is telescopic with the bottom cylinder. Each main landing gear further includes a yoke including a lower trunnion and an upper trunnion, wherein the lower trunnion pivotally couples a bottom of the yoke with the top cylinder of the shock strut, and the upper trunnion pivotally couples a top of the yoke with an aircraft structure. Each main landing gear also includes a retraction actuator configured to pivot the top of the yoke about the upper trunnion to rotate the yoke back toward a tail and up toward a fuselage of the aircraft. Each main landing gear further includes a radius arm to position the shock strut to pivot about the lower trunnion and fold relative to the bottom of the yoke to retract the wheels forward toward a nose of the aircraft and up toward the fuselage of the aircraft.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Figure 1:
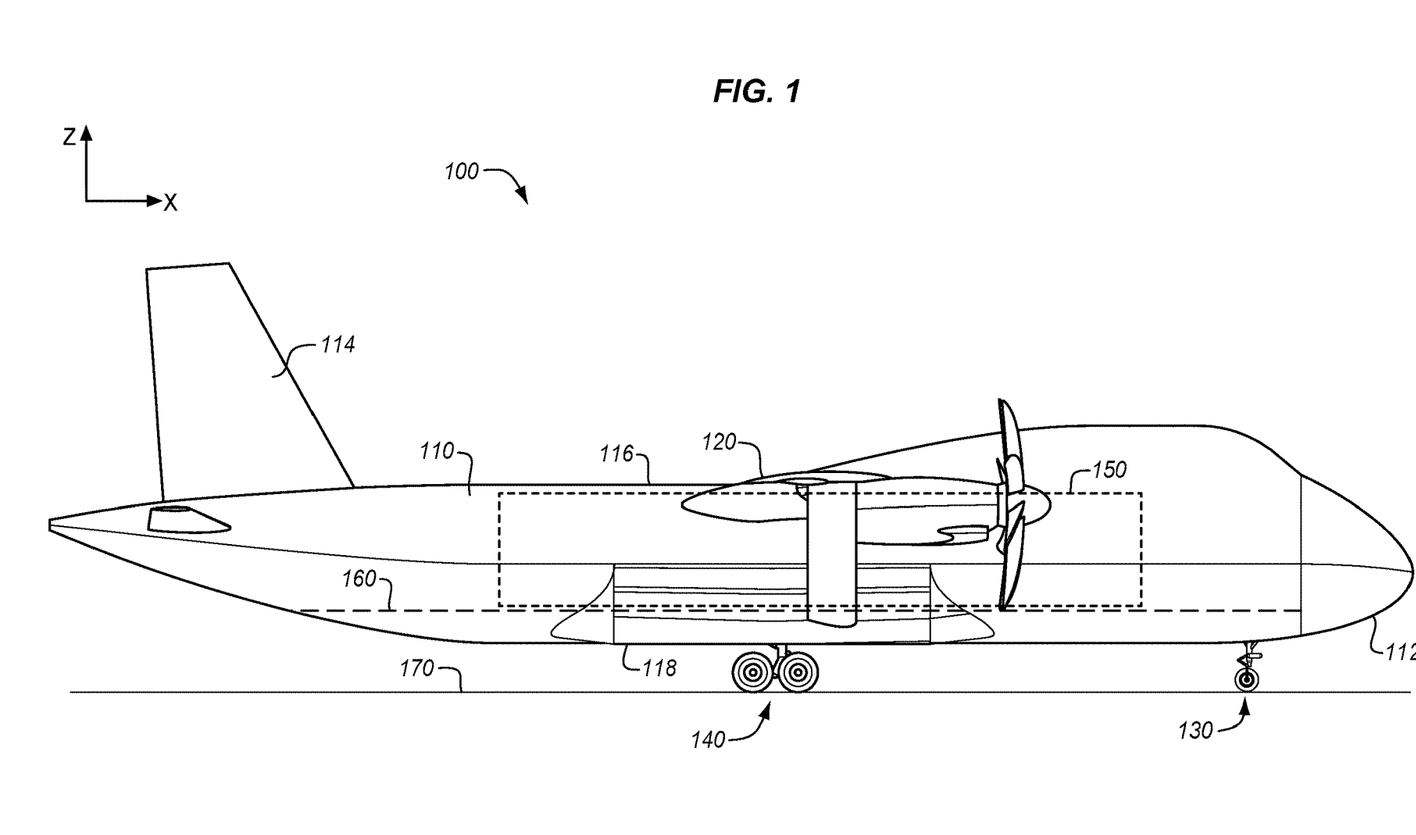
FIG. 1 is a side view of an aircraft in an illustrative embodiment.

FIG. 1 is a side view of an aircraft 100 in an illustrative embodiment. The aircraft 100 includes a fuselage 110 including a nose 112, and also includes tail 114. The aircraft 100 also includes wings 120, nose landing gear 130, and main landing gear 140. As described in greater detail below, the aircraft 100 is enhanced with the main landing gear 140 configured to provide increased interior space of the fuselage 110, increased ground stability, and reduced aerodynamic drag. The main landing gear 140 is also able to extend without hydraulics using gravity and aerodynamic drag.

Features of the main landing gear 140 may be applicable in embodiments in which the aircraft 100 is a cargo aircraft. For example, as shown in FIG. 1, the aircraft 100 may include a high-wing configuration in which the wings 120 attach at or near a top 116 of the fuselage 110 to maximize interior space of the fuselage 110 for cargo 150, such as a shipping container. The aircraft 100 may also exclude a wheel well to maximize interior space of the fuselage 110. Additionally, the aircraft 100 may include a cargo floor 160 extending longitudinally the fuselage 110 to support the cargo 150. The aircraft 100 may have a low-deck configuration in which a height from the ground 170 to a—118 of the fuselage 110 or the cargo floor 160 is low for easier loading and unloading of the cargo 150. It will be appreciated, however, that the features and functions of the main landing gear 140 described in greater detail below may apply to alternative aircraft having some combination of cargo carrying features described above or no such features.

Figure 2:
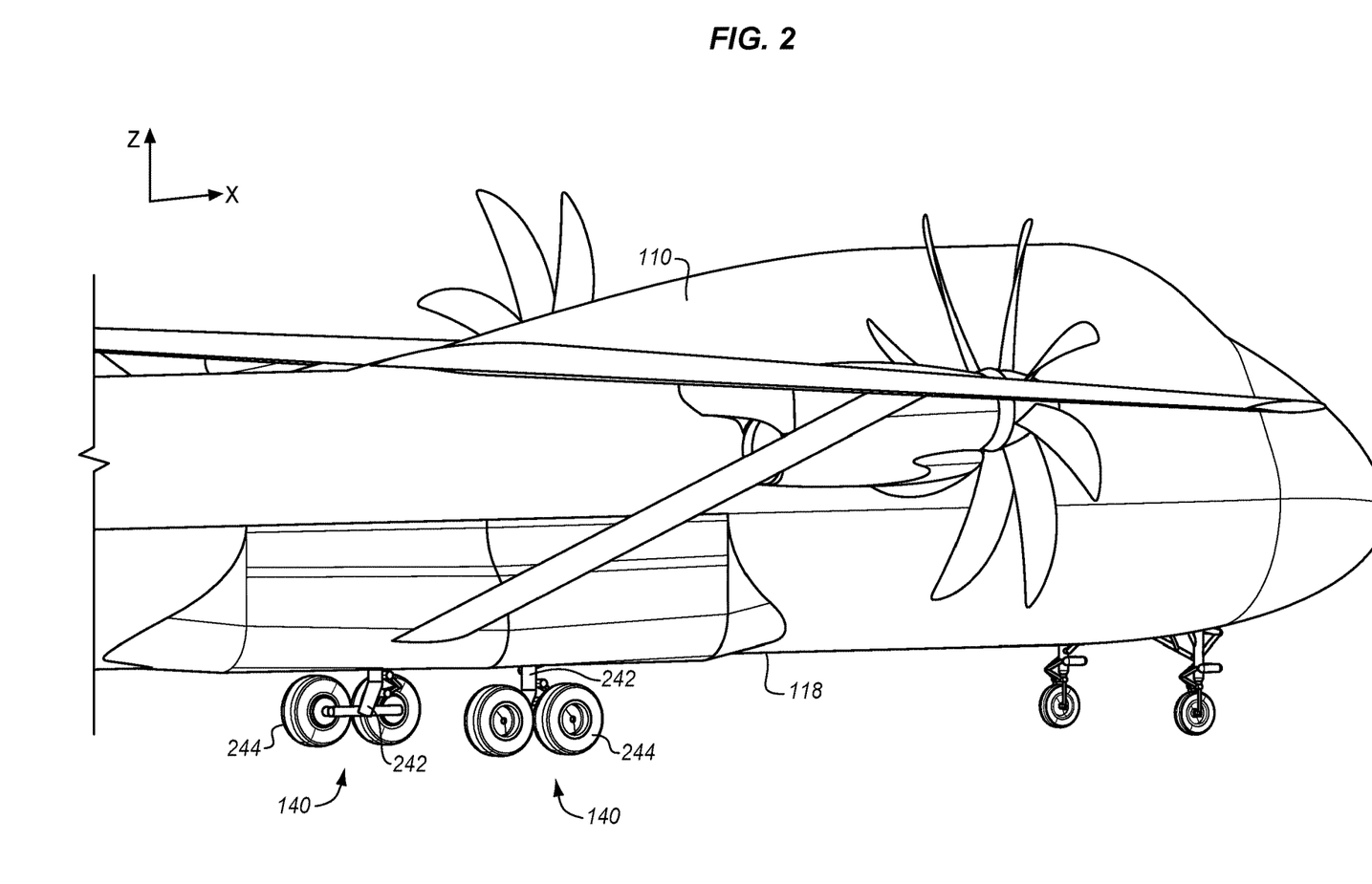
FIG. 2 is a perspective side view of the aircraft in an illustrative embodiment.

FIG. 2 is a perspective side view of the aircraft 100 in an illustrative embodiment. As shown in FIG. 2, the aircraft 100 may include a pair of nose landing gears and a pair of main landing gears 140. Generally, the nose landing gears support the fuselage 110 at a position toward the nose 112, and the main landing gears 140 support the fuselage 110 at a position aft of the nose landing gears, toward a middle section between the nose 112 and the tail 114. The pair of main landing gears 140 may include a pair of posts 242 disposed across the fuselage 110. The pair of posts 242 may generally straddle a center line extending longitudinally along the belly 118 of the fuselage 110. Each post 242 has one or more main wheels 244 rotatably attached thereto. Additional details of the function and structure of the main landing gears 140 are described in greater detail below.

Figure 3:
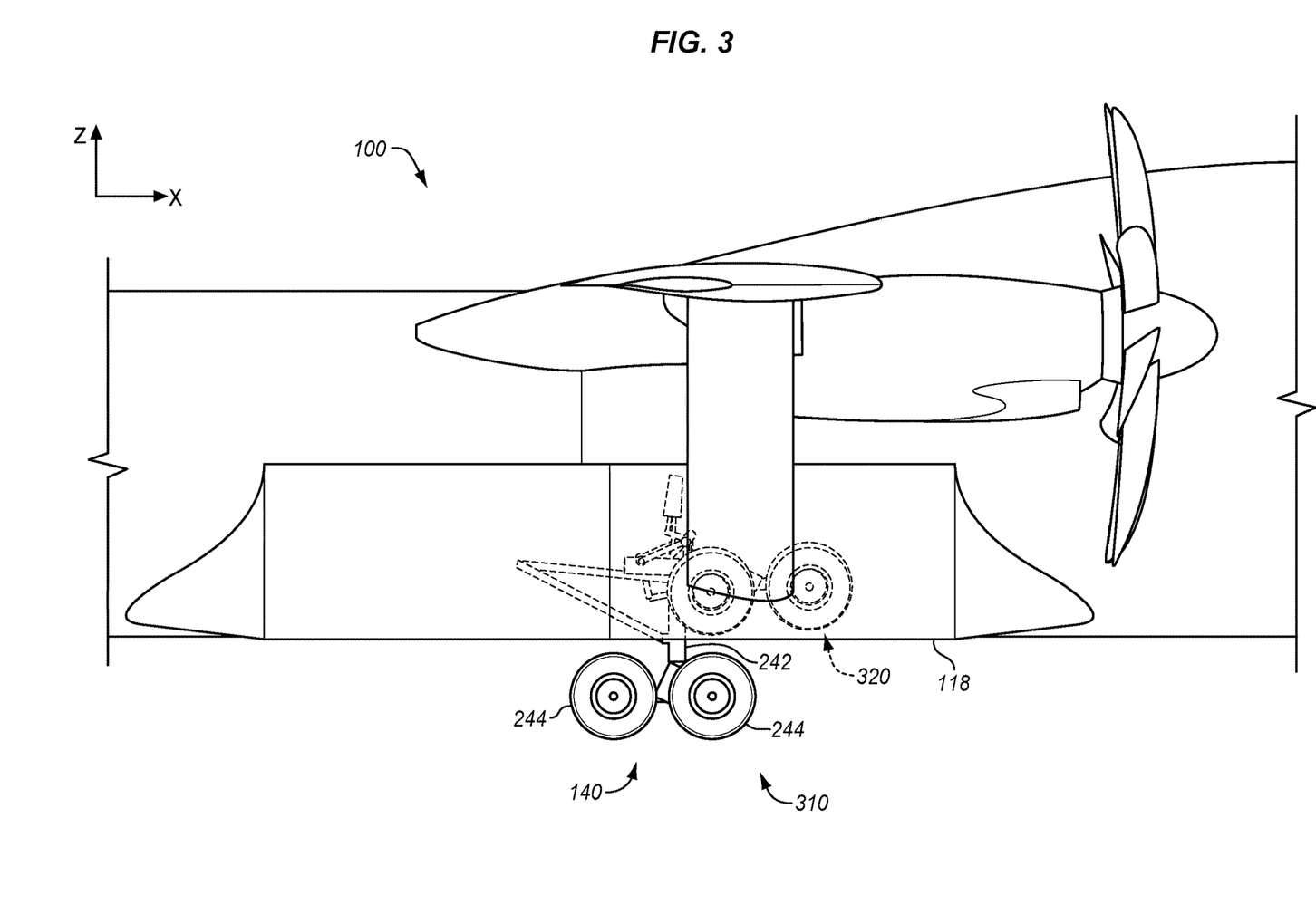
FIG. 3 is a side view of the main landing gear of the aircraft in an illustrative embodiment.

FIG. 3 is a side view of the main landing gear 140 of the aircraft 100 in an illustrative embodiment. Each main landing gear 140 is configured to pivot forward (e.g., toward the nose 112 or in the x-direction) to retract. In particular, from an extended position 310 where the main landing gear 140 supports the aircraft 100 on the ground 170, the main landing gear 140 pivots forward to a retracted position 320 where the main wheels 244 tuck against the side of the fuselage 110. Portions of the post 242 and/or main wheels 244 protruding from the fuselage 110 is minimal in the retracted position 320 to reduce or minimize aerodynamic drag. Additionally, since the main landing gears 140 retract forward, each main landing gear 140 is configured to extend the post 242 to the extended position 310 via gravity and aerodynamic drag. For example, in the event of a hydraulic or power failure of the aircraft 100, each main landing gear 140 is able to reach the extended position 310 for landing by being lowered from gravitational pull on its weight and being pushed backward by air as the aircraft 100 travels forward. In one embodiment, each post 242 includes at least two main wheels 244 arranged in tandem longitudinally (e.g., along the x-direction) of the aircraft 100, as shown in FIG. 3. The forward retraction and tandem arrangement of the main wheels 244 advantageously minimizes the front profile of the main landing gears 140 in the retracted position 320 to minimize aerodynamic drag in the absence of a wheel well.

Figure 4:
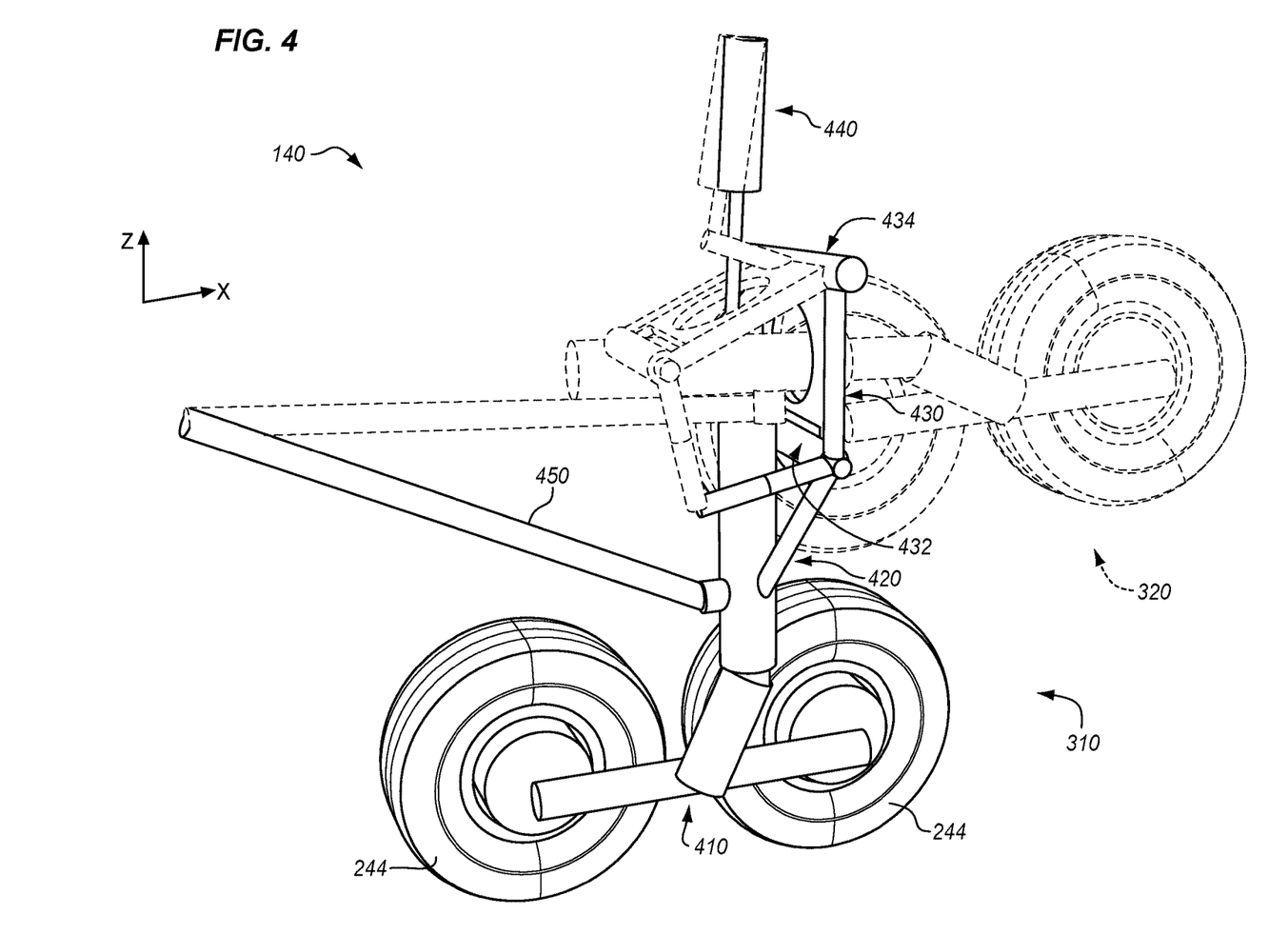
FIG. 4 is a side perspective view of the main landing gear in an illustrative embodiment.

FIG. 4 is a side perspective view of the main landing gear 140 in an illustrative embodiment. In particular, FIG. 4 shows an inboard side of the main landing gear 140. As earlier described, the main landing gear 140 pivots forward from the extended position 310 to the retracted position 320, as indicated by the dashed outline and arrows of FIG. 4. The main landing gear 140 includes a truck 410 coupled with the main wheels 244, and a shock strut 420 coupled to the truck 410. The main landing gear 140 further includes a yoke 430 pivotally coupled with the shock strut 420 via a lower trunnion 432, and pivotally coupled with an aircraft structure (not shown in FIG. 4) via an upper trunnion 434. In general, the lower trunnion 432 and the upper trunnion 434 may each comprise a joint structure, such as a shaft rotatably about bearings, to pivotally join two structures.

As shown in FIG. 4, the yoke 430 is configured to pivot about the upper trunnion 434 in a direction back toward the tail 114 of the aircraft 100 and up toward the sides of the fuselage 110 of the aircraft 100. Additionally, the shock strut 420 is configured to pivot about the lower trunnion 432 in a direction forward toward the nose 112 of the aircraft 100 and up toward the fuselage 110 of the aircraft 100 to retract the main wheels 244. The main landing gear 140 is thus configured to fold, with its upper structure folding aft during retraction, and its lower structure, including the shock strut 420, the truck 410, and the main wheels 244, folding forward during retraction. The configuration of the main landing gear 140 advantageously enables the structure to tuck closely with the fuselage 110 and to reside outside the cargo volume of the aircraft 100 in the retracted position 320.

To facilitate retraction, the main landing gear 140 further includes a retraction actuator 440 configured to rotate the yoke 430 about the upper trunnion 434 in the direction back toward the tail 114. Additionally, the main landing gear 140 includes a radius arm 450 coupled to the shock strut 420 and configured to position the shock strut 420 to fold about the lower trunnion 432 in the direction forward toward the nose 112 of the aircraft 100 as the yoke 430 rotates in the direction back toward the tail 114. In other words, the radius arm 450 maintains the shock strut 420 forward to facilitate the folding action of the main landing gear 140. Additionally, in the extended position 310 the radius arm 450 reacts the drag load (e.g., fore-and-aft acting loads) of the aircraft 100.

Figure 5:
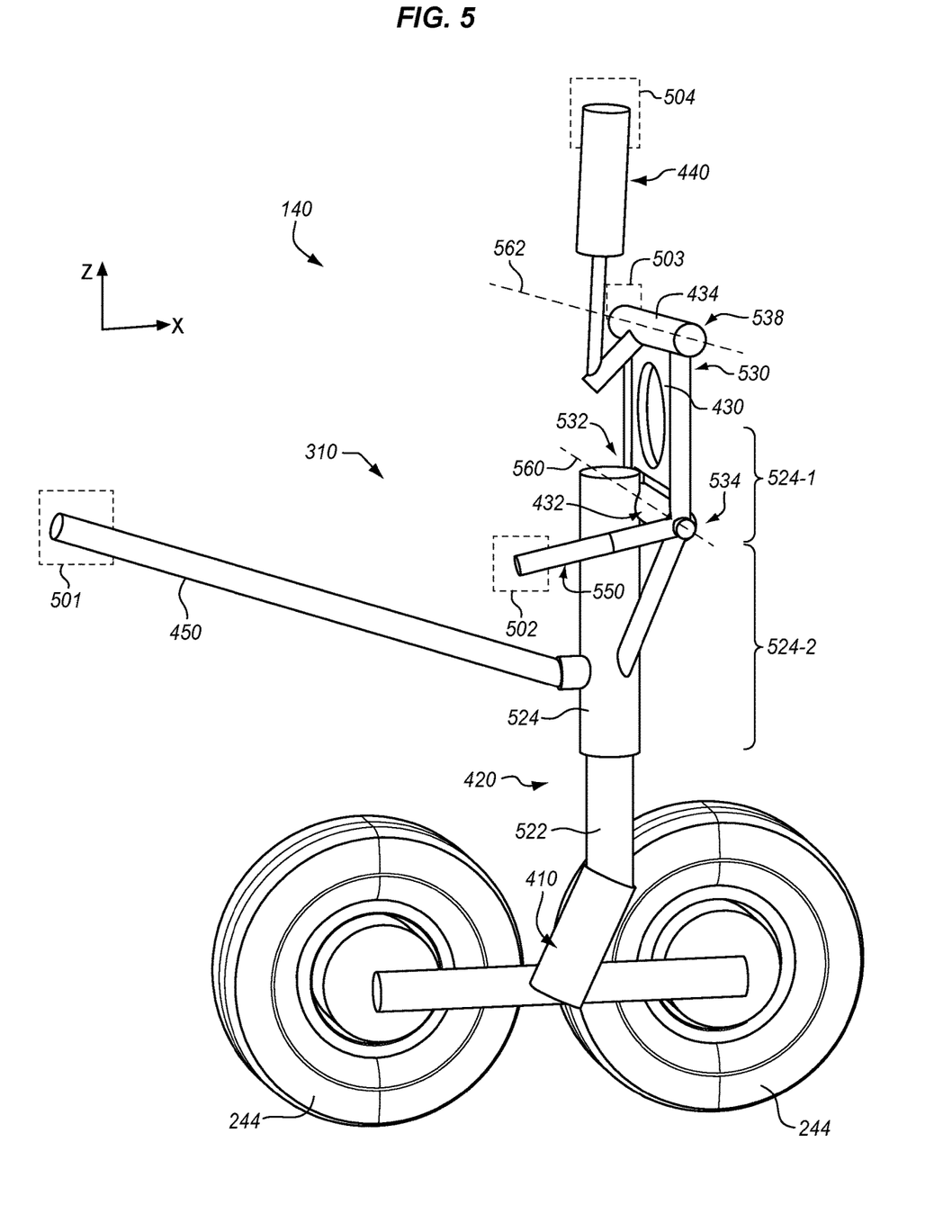
FIG. 5 is a side perspective view of the main landing gear in another illustrative embodiment.

FIG. 5 is a side perspective view of the main landing gear 140 in another illustrative embodiment. In general, FIG. 5 illustrates the main landing gear 140 in the extended position 310 with additional detail of its structural configuration. The main landing gear 140 is attached with the aircraft 100 at aircraft structure 501-504 representing fixed structural attachment points to the aircraft 100 and indicated by the dashed squares in FIG. 5.

The shock strut 420 includes a bottom cylinder 522 coupled with the truck 410, and a top cylinder 524 that is telescopic with the bottom cylinder 522. The bottom cylinder 522 and the top cylinder 524 may also be referred to as inner cylinder and outer cylinder, respectively. Generally, the bottom cylinder 522 slides in the top cylinder 524, and the shock strut 420 uses hydraulic fluid to absorb and dissipate shock loads on landing. In previous main landing gear arrangements, a top cylinder of the shock strut attaches directly with a fixed structure of the aircraft.

By contrast, as shown in FIG. 5, the top cylinder 524 of the shock strut 420 couples with the yoke 430. More particularly, the top cylinder 524 includes an upper portion 524-1 and a lower portion 524-2. The upper portion 524-1 couples with the yoke 430 via the lower trunnion 432, and the lower portion 524-2 couples with the radius arm 450. In one embodiment, the yoke 430 comprises a plate body 530 having an upper perimeter including or pivotable with the upper trunnion 434, and a lower perimeter including or pivotable with the lower trunnion 432. The lower trunnion 432 extends in an inboard direction from the top cylinder 524 and defines a first hinge axis 560. That is, the lower trunnion 432 includes an outboard end 532 attached to the top cylinder 524, and an inboard end 534 distal from the outboard end 532.

The radius arm 450 comprises a support member pivotally attached with an aircraft structure 501 at one end, and attached with an aft side and/or lower portion 524-2 of the top cylinder 524 at the other end. Additionally, the main landing gear 140 includes lock links 550 attached with an aircraft structure 502 at one end, and attached to the inboard end 534 of the lower trunnion 432 at the other end. The lock links 550 comprise a hinged structure configured to stabilize the yoke 430. In particular, with the main landing gear 140 in the extended position 310, the lock links 550 straighten over center to stabilize the yoke 430 and react torsional loads applied to the main landing gear 140 while the aircraft 100 is on the ground. The structural configuration of the yoke 430, including its attachment with the top cylinder 524 and the lock links 550, advantageously enables the main landing gear 140 to be disposed further outboard on the aircraft 100, increasing stability for cargo, while still enabling the main landing gear 140 to retract closely to the fuselage 110 during flight for minimized aerodynamic drag.

The upper trunnion 434 is generally disposed above the lower trunnion 432 and defines a second hinge axis 562. In some embodiments, the plate body 530 of the yoke 430 comprises a rectangular frame with the lower trunnion 432 and first hinge axis 560 extending along a bottom of the frame, and the upper trunnion 434 and second hinge axis 562 extending along a top of the frame. The upper trunnion 434 includes an inboard end 538 pivotally coupled with aircraft structure 503 to attach the yoke 430 with the aircraft 100. Additionally, the retraction actuator 440 may attach with aircraft structure 504 and apply rotational force to the yoke 430 as further described below.

Figure 6:
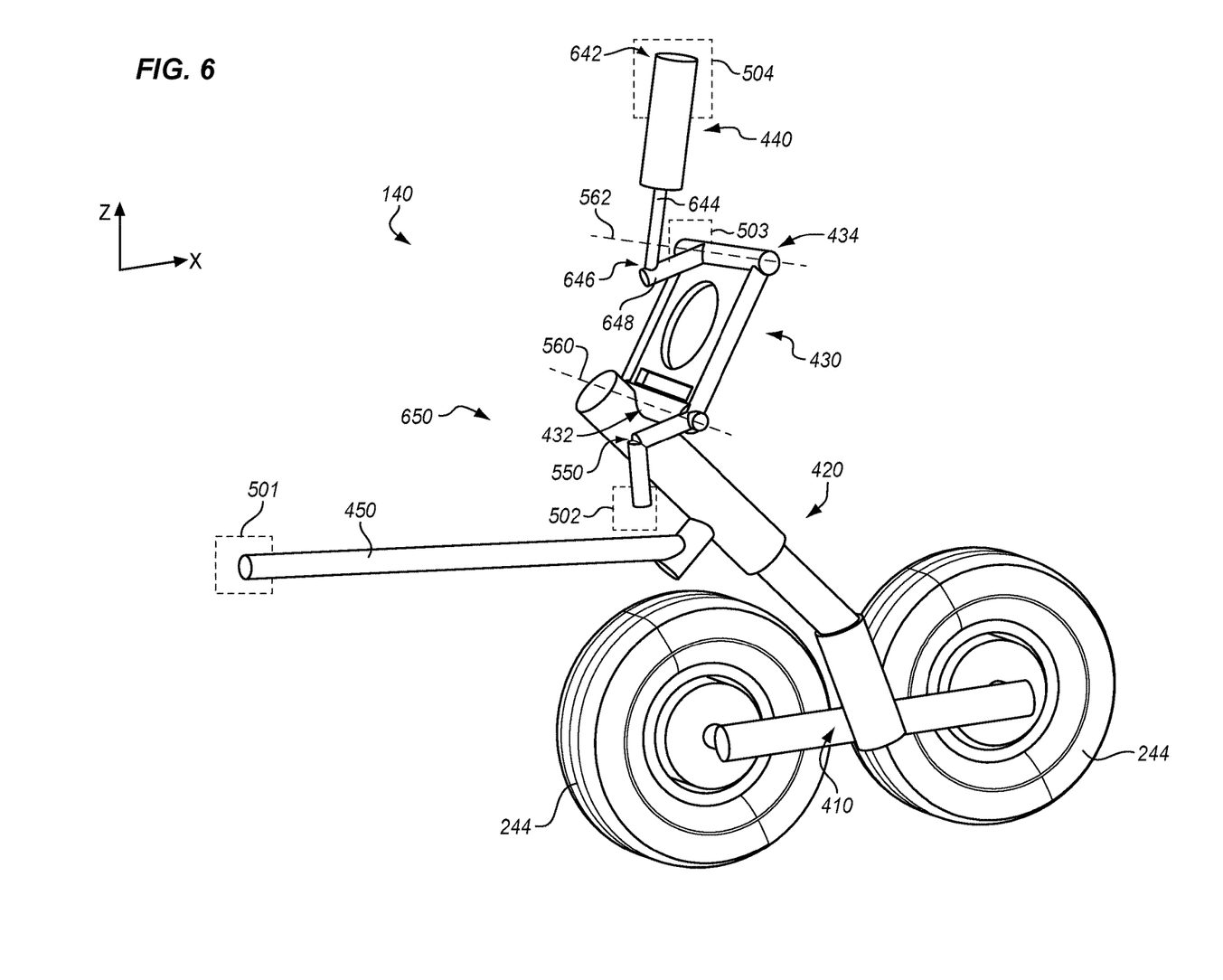
FIG. 6 is a side perspective view of the main landing gear in yet another illustrative embodiment.

FIG. 6 is a side perspective view of the main landing gear 140 in yet another illustrative embodiment. More particularly, FIG. 6 illustrates the main landing gear 140 in a middle position 650 that is between the extended position 310 and the retracted position 320. Additionally, FIG. 6 shows that the retraction actuator 440 may include a headend 642, a rod 644, and a rod end 646. The rod end 646 couples with a retraction horn 648 extending from the upper trunnion 434. The retraction horn 648 may extend in a direction up and/or aft from the upper trunnion 434. Accordingly, the retraction actuator 440 is configured to pull the rod 644 and the retraction horn 648 up/forward to apply torque to the upper trunnion 434 and swing the yoke 430 backward (e.g., toward the tail 114) about the second hinge axis 562.

Meanwhile, the radius arm 450 maintains the shock strut 420 forward so that the shock strut 420 and main wheels 244 fold about the first hinge axis 560 in an opposite rotational direction to that of the yoke 430. That is, the shock strut 420 may comprise a rigid support member extending forward from the aircraft structure 501 (e.g., a frame structure of the aircraft 100) and pivotable about the aircraft structure 501 in an upward direction to support the forward/up retraction of the shock strut 420 and main wheels 244. Additionally, with the main landing gear 140 in the middle position 650, the lock links 550 are configured to hinge over center to allow the yoke 430 to pivot aft/up unimpeded as the main landing gear 140 retracts. The rotational force applied to the yoke 430 also pulls the shock strut 420, truck 410, and main wheels 244 up toward the fuselage 110 of the aircraft 100.

Figure 7:
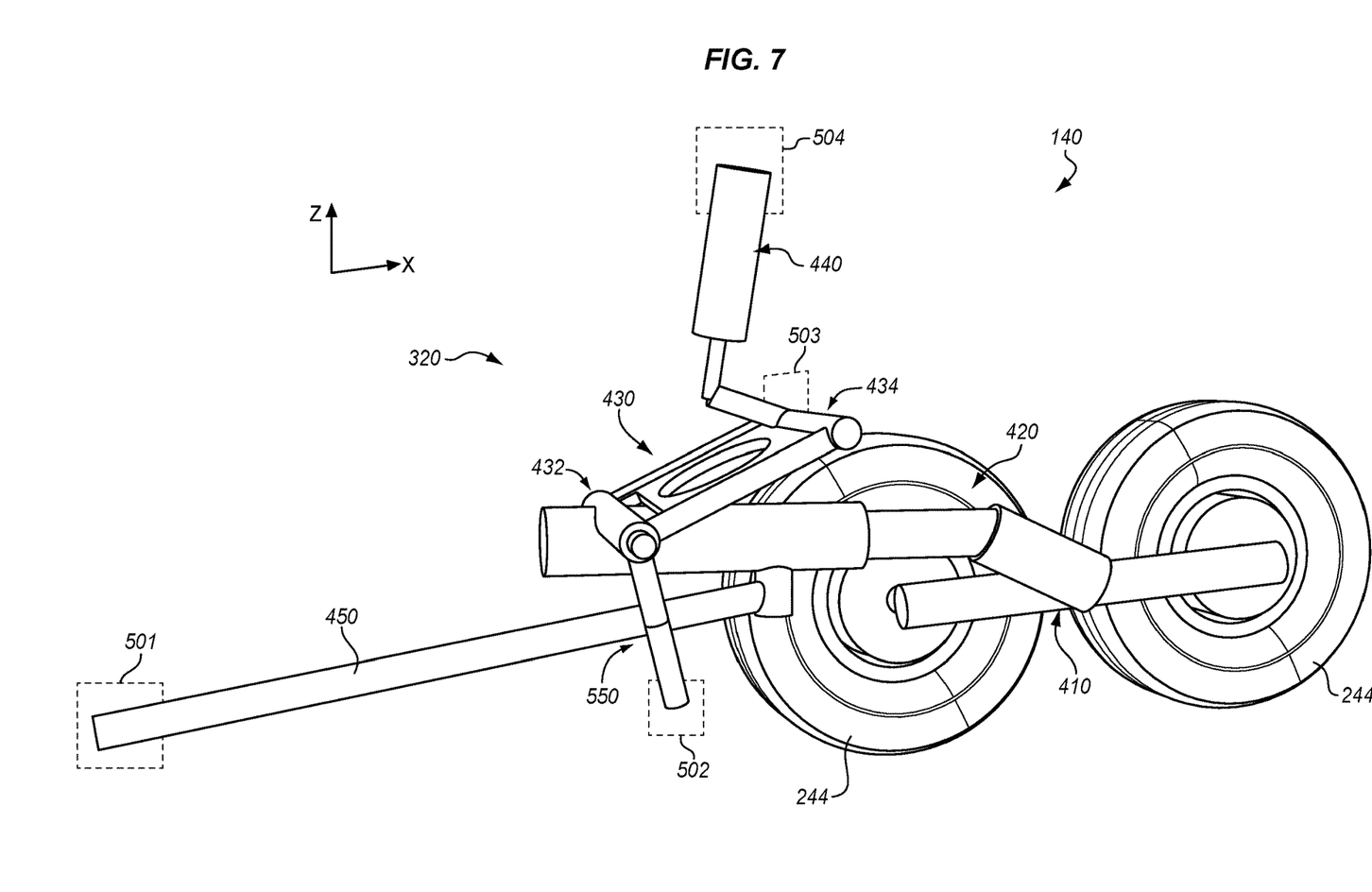
FIG. 7 is a side perspective view of the main landing gear in a further illustrative embodiment.

FIG. 7 is a side perspective view of the main landing gear 140 in a further illustrative embodiment. FIG. 7 illustrates the main landing gear 140 in the retracted position 320. As the main landing gear 140 reaches the retracted position 320, the lock links 550 are configured to straighten again to hold the main landing gear 140 in the retracted position 320.

With the yoke 430 pivoted about the upper trunnion 434 aft and up, and the shock strut 420, truck 410, and main wheels 244 pivoted about the lower trunnion 432 forward and up, the main landing gear 140 is able to retract against the fuselage 110 into a compact size. The structure of the landing gear 140 in the retracted position 320 is thus able to tuck closely against the sides of the fuselage 110. Additionally, the forward retraction and/or tandem arrangement of the main wheels 244 minimizes the front facing profile of the main landing gear 140 to reduce aerodynamic drag in the absence of a wheel well. Also, because the main wheels 244 retract forward, they are able to extend using only gravity and aerodynamic drag, allowing the aircraft 100 to prepare for landing even in instances for which a hydraulic failure has occurred.

Figure 8:
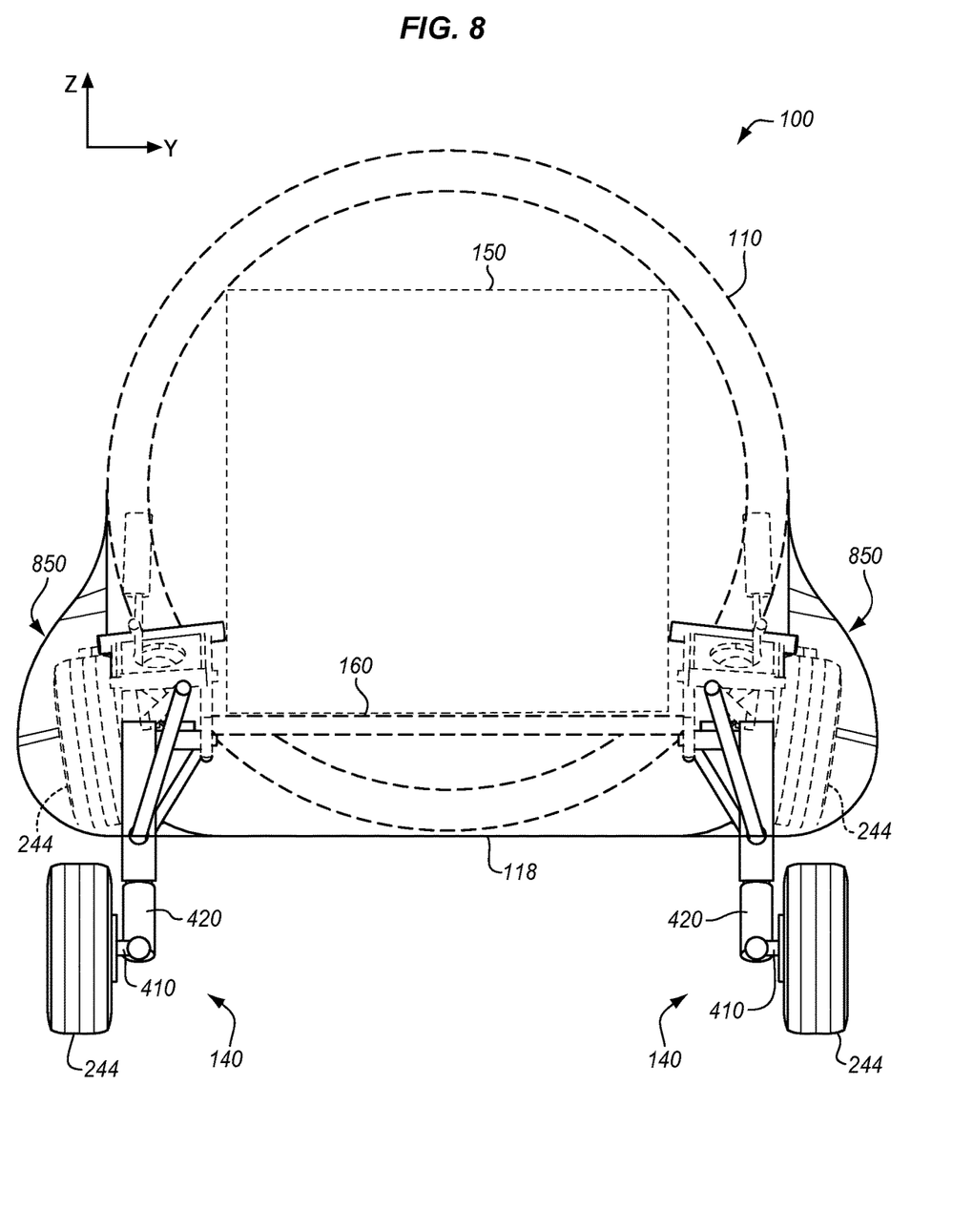
FIG. 8 is a rear view of the pair of main landing gears of the aircraft in an illustrative embodiment.

FIG. 8 is a rear view of the pair of main landing gears 140 of the aircraft 100 in an illustrative embodiment. FIG. 8 illustrates an example of how the main landing gears 140, using the configuration and structure previously described, may position relative to the aircraft 100 to provide features beneficial for carrying cargo 150. For example, as shown in FIG. 8, the structure of each main landing gear 140 may be disposed outboard from, or at/underneath outboard sides of, the cargo floor 160. For example, a distance between the main landing gears 140 (e.g., in the y-direction) may be larger than a width of the cargo floor 160. The wide stance configuration of the main landing gears 140 advantageously increases ground stability of the aircraft 100 to reduce tipping risk. The increased stability helps offset a higher center of gravity the aircraft 100 may have by incorporating a high-wing configuration that carries bulky cargo, such as shipping containers.

Additionally, as previously described, the forward retraction and tandem arrangement of the main wheels 244 advantageously minimizes the profile of body fairings 850 of the aircraft 100 to minimize aerodynamic drag in the absence of a wheel well. Still further, the retraction configuration of the main landing gears 140 eliminates structure directly underneath the belly 118, thereby enabling the belly 118 and the cargo floor 160 to be lower to the ground to increase ground stability and facilitate loading and unloading of the cargo 150. In some embodiments, the main landing gears 140 are configured to retract the main wheels 244 outboard from the cargo floor 160 with at least a portion of the main wheel(s) 244 at a same height higher than the cargo floor 160. This allows the body fairings 850 to be located more toward sides of the fuselage 110 to free up space near the belly 118 for low ground clearance configurations of the aircraft 100. Alternatively or additionally, the main landing gears 140 may be positioned along or proximate with a vertical tangent line to the sides of the fuselage 110 for efficient and stable carrying of cargo.

Figure 9:
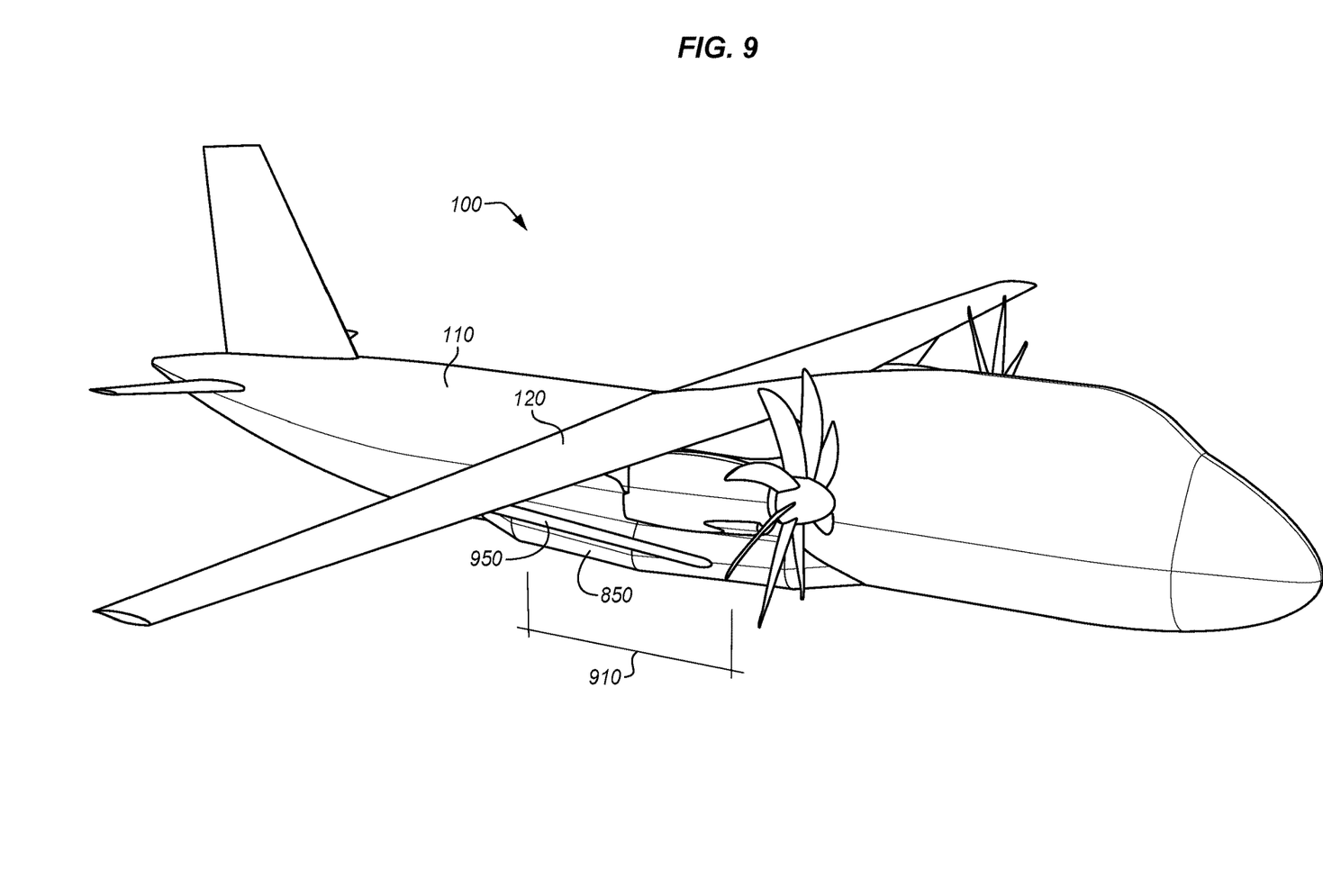
FIG. 9 is another perspective view of the aircraft in another illustrative embodiment.

FIG. 9 is another perspective view of the aircraft 100 in another illustrative embodiment. A further advantage of the main landing gears 140 described above is that its folding configuration reduces the length of the main landing gears 140 in the retracted position 320. For example, a longitudinal length 910 of the main landing gear 140 (e.g., extending longitudinally with the fuselage 110) in the retracted position 320 is reduced so that the structure of the main landing gear 140 may integrate with a wing support sponson 950 of the aircraft 100. By reducing a retraction length of the main landing gear 140, a length of the bodying faring 850 may also be reduced such that the wing support sponson 950 may extend from a bottom of the wing 120 to a position that is forward on the fuselage 110 of the aircraft 100 from the structure of the main landing gear 140.

Figure 10:
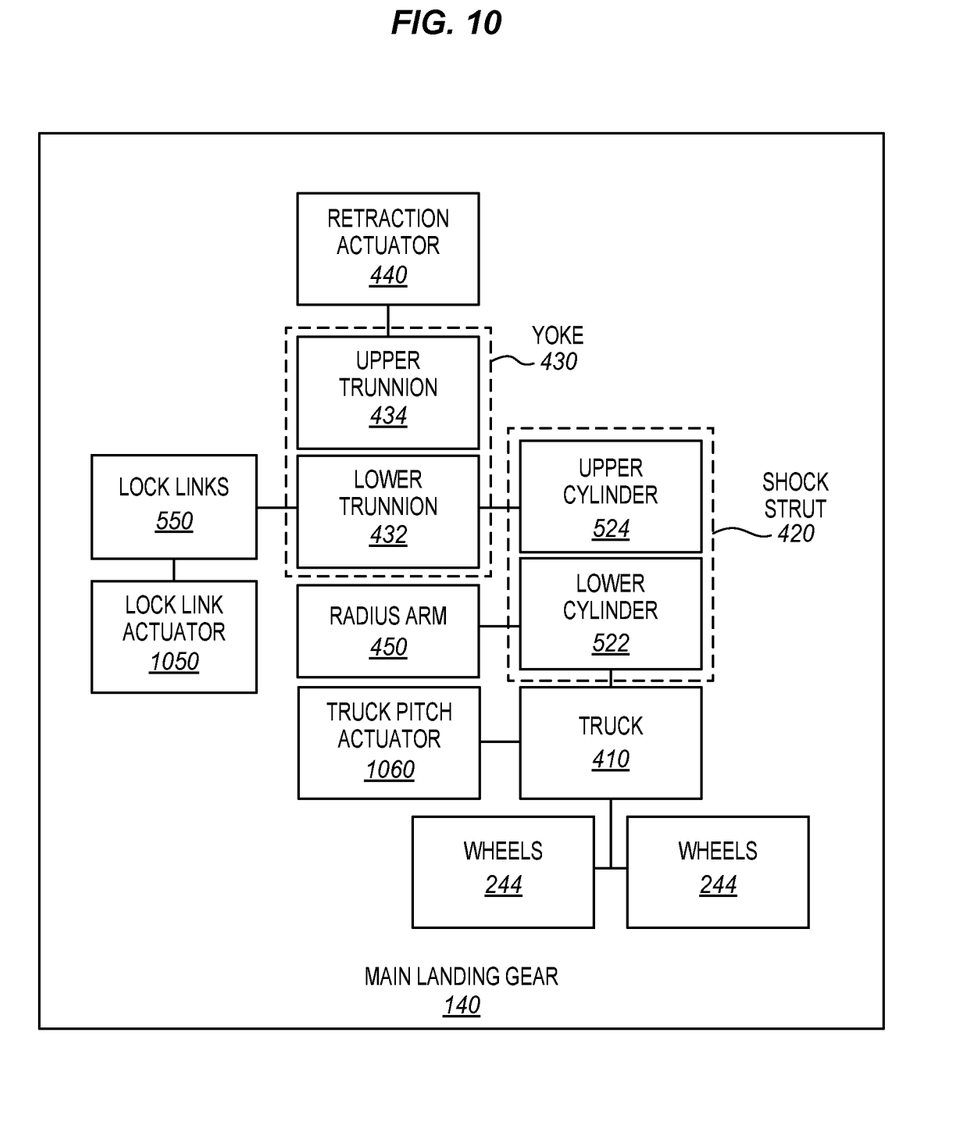
FIG. 10 is a block diagram of the main landing gear in an illustrative embodiment.

FIG. 10 is a block diagram of the main landing gear 140 in an illustrative embodiment. In addition to elements already described, the main landing gear 140 may further include a lock link actuator 1050 configured to initiate the hinging motion of the lock links 550 from their straightened position. For instance, the lock link actuator 1050 may push the lock links 550 over center to allow the main landing gear 140 to initiate folding/unfolding. The main landing gear 140 may further include a truck pitch actuator 1060 coupled with the truck 410 and configured to maintain a level orientation of the truck 410 during retraction/extension of the main landing gear 140.

Figure 11:
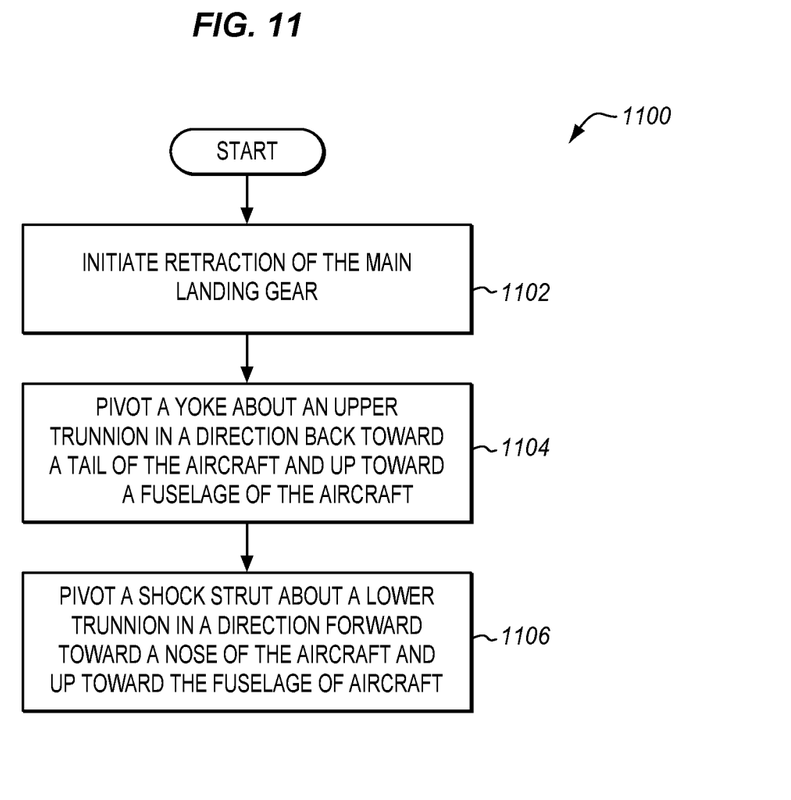
FIG. 11 is a flowchart illustrating a method for retracting the main landing gear in an illustrative embodiment.

FIG. 11 is a flowchart illustrating a method 1100 for retracting the main landing gear 140 in an illustrative embodiment. The steps of the method 1100 are described with reference to the main landing gear 140 and the aircraft 100 of FIGS. 1-9, but those skilled in the art will appreciate that method 1100 may be performed with alternative main landing gear structures and aircraft. The steps of the flowcharts described herein are not all inclusive and may include other steps not shown. The steps described herein may also be performed in an alternative order.

In step 1102, retraction of the main landing gear 140 is initiated. As earlier described, the main landing gear 140 may include the truck 410 coupling one or more main wheels 244, the shock strut 420 attached to the truck 410, and the yoke 430 pivotably coupled with the shock strut 420 via the lower trunnion 432 and pivotably coupled with the retraction actuator 440 via the upper trunnion 434. Retraction of the main landing gear 140 may initiate via pilot control in the cockpit of the aircraft 100 that instructs the lock link actuator 1050 to un-straighten or unlock the lock links 550 for pivotable movement of the main landing gear 140.

In step 1104, the yoke 430 pivots about the upper trunnion 434 in a direction back toward the tail 114 and up toward the fuselage 110 of the aircraft. Rotational torque on the yoke 430 may be applied via the retraction actuator 440 applying a linear force on the retraction horn 648 extending from the upper trunnion 434. In step 1106, the shock strut 420 pivots about the lower trunnion 432 in a direction forward toward the nose 112 and up toward the fuselage 110 of the aircraft. Thus, a top portion of the main landing gear 140 folds aft/up and a bottom portion of the main landing gear 140 folds forward/up to retract the main wheels 244. The method 1100 provides an advantage over prior techniques by enabling the main landing gear 140 to fold during retraction so that the structure of the main landing gear 140 may retract close to the fuselage 110 while providing further structural advantages for supporting cargo carried by the aircraft 100.

Although specific embodiments were described herein, the scope is not limited to those specific embodiments. Rather, the scope is defined by the following claims and any equivalents thereof.

What is claimed is:

1. A main landing gear to support a fuselage of a cargo aircraft comprising:
   a retraction actuator;
   a shock strut disposed outboard from a cargo floor and coupled to a truck with one or more wheels; and
   a yoke pivotally coupled with the shock strut via a lower trunnion, and pivotally coupled with an aircraft structure via an upper trunnion,
   wherein the yoke is configured to pivot about the upper trunnion in a direction back and up toward the fuselage, and the shock strut is configured to pivot about the lower trunnion in a direction forward and up toward the fuselage to retract the one or more wheels to a retracted position in which the one or more wheels reside outboard of the cargo floor and outside the fuselage, wherein the retraction actuator, the shock strut, and the truck of the main landing gear are disposed inboard of all of the one or more wheels of the main landing gear while the main landing gear is retracted, and the retraction actuator is disposed above all of the one or more wheels of the main landing gear while the main landing gear is retracted, wherein the retraction actuator includes a rod end configured to retract in a direction that is more vertical than lateral, resulting in retraction of the main landing gear.

2. The main landing gear of claim 1 wherein:
   the retraction actuator is further configured to retract a rod having the rod end, rotating the yoke about the upper trunnion in the direction back toward the tail; and the main landing gear further comprises:
   a radius arm coupled to the shock strut and configured to position the shock strut to fold about the lower trunnion in the direction forward toward a nose of the cargo aircraft as the yoke rotates in the direction back toward the tail via retraction of the rod.

3. The main landing gear of claim 2 wherein:
   the rod is attached with a retraction horn extending from the upper trunnion, and
   the retraction actuator is configured to pull the retraction horn to rotate the yoke about the upper trunnion in the direction back toward the tail and up toward the fuselage.

4. The main landing gear of claim 2 wherein:
   the shock strut includes a bottom cylinder coupled with the truck, and a top cylinder that is telescopic with the bottom cylinder, and the lower trunnion includes an outboard end attached with the top cylinder, and an inboard end attached with lock links configured to stabilize the yoke.

5. The main landing gear of claim 4 wherein:
   the radius arm is coupled with a lower portion of the top cylinder, and the lower trunnion is coupled with an upper portion of the top cylinder.

6. The main landing gear of claim 4 wherein:
   the yoke comprises a plate body having an upper perimeter including the upper trunnion, and a lower perimeter including the lower trunnion, and
   the lower trunnion extends inboard from the top cylinder.

7. The main landing gear of claim 1 further comprising:
   lock links coupled to an inboard end of the lower trunnion and configured to stabilize the yoke.

8. A method of retracting a main landing gear configured to support a fuselage of a cargo aircraft, the method comprising:
   initiating retraction of the main landing gear including a truck having one or more wheels, a shock strut disposed outboard from a cargo floor and attached to the truck, and a yoke pivotably coupled with the shock strut via a lower trunnion and pivotably coupled with a retraction actuator via an upper trunnion, wherein the retraction actuator includes a rod end that retracts in a direction that is more vertical than lateral, resulting in retraction of the main landing gear;

pivoting the yoke about the upper trunnion in a direction back and up toward the fuselage of the cargo aircraft; and pivoting the shock strut about the lower trunnion in a direction forward and up toward the fuselage to retract the main landing gear to a retracted position in which the one or more wheels reside outboard of the cargo floor and outside the fuselage, wherein in the retracted position, the retraction actuator, the shock strut, and the truck of the main landing gear are disposed inboard of all of the one or more wheels of the main landing gear, the retraction actuator is disposed above all of the one or more wheels of the main landing gear while the main landing gear is retracted.

9. The method of claim 8 further comprising:
positioning the shock strut forward with a radius arm while the yoke and the shock strut fold in opposite rotational directions.

10. The method of claim 8 further comprising:
unlocking lock links that couple the yoke with the cargo aircraft to initiate retraction of the main landing gear.

11. The method of claim 10 further comprising:
re-locking the lock links over center as the main landing gear positions to a retracted position.

12. The method of claim 8 further comprising:
maintaining a level orientation of the truck attached to the shock strut during retraction of the main landing gear.

13. The method of claim 8 further comprising rotating the yoke about the upper trunnion with a retraction actuator.

14. A cargo aircraft comprising:
a fuselage including a cargo floor;
wings attached to an upper portion of the fuselage, resulting in a high-wing configuration for the cargo aircraft; and
a pair of main landing gears to support the fuselage, each main landing gear comprising:
wheels coupled by a truck and arranged in tandem longitudinally;
a shock strut disposed outboard from a cargo floor, the shock strut including a bottom cylinder attached to the truck, and a top cylinder that is telescopic with the bottom cylinder;
a yoke including a lower trunnion and an upper trunnion, wherein the lower trunnion pivotally couples a bottom of the yoke with the top cylinder of the shock strut, and the upper trunnion pivotally couples a top of the yoke with an aircraft structure;
a retraction actuator configured to pivot the top of the yoke about the upper trunnion to rotate the yoke back toward a tail and up toward the fuselage, and to pivot the shock strut about the lower trunnion in a direction forward and up to retract the wheels to a retracted position in which the wheels reside outboard of the cargo floor and outside the fuselage, wherein the retraction actuator, the shock strut, and the truck of the main landing gear are disposed inboard of all of the wheels of the main landing gear while the main landing gear is retracted, the retraction actuator is disposed above all of the one or more wheels of the main landing gear while the main landing gear is retracted, and the retraction actuator includes a rod end configured to retract in a direction that is more vertical than lateral, resulting in retraction of the wheels.

15. The cargo aircraft of claim 14, wherein:
the retraction actuator includes a rod attached with a retraction horn extending from the upper trunnion, and
the retraction actuator is configured to pull the retraction horn to rotate the yoke about the upper trunnion in the direction back toward the tail and up toward the fuselage.

16. The cargo aircraft of claim 14 wherein:
the yoke comprises a plate body having an upper perimeter including the upper trunnion, and a lower perimeter including the lower trunnion, and
the lower trunnion extends inboard from the top cylinder.

17. The cargo aircraft of claim 16 wherein:
the yoke comprises a rectangular frame.

18. The cargo aircraft of claim 14 wherein each main landing gear further includes:
lock links coupled to an inboard end of the lower trunnion and configured to stabilize the yoke.

19. The cargo aircraft of claim 14 further comprising:
a body fairing to cover one of the main landing gears in a retracted position; and
a wing support sponson extending from a wing to a position in front of the main landing gear in the retracted position.

20. The cargo aircraft of claim 14 wherein each main landing gear further includes:
a radius arm to position the shock strut to pivot about the lower trunnion and fold relative to the bottom of the yoke to retract the wheels forward and up.

* * * * *